United States Patent [19]

Akima et al.

[11] 4,243,784
[45] Jan. 6, 1981

[54] PROCESS FOR PRODUCING POWDERED COPOLYMERS OF ETHYLENICALLY UNSATURATED COMPOUND AND MALEIC ANHYDRIDE OR AN ESTER THEREOF

[75] Inventors: Tosio Akima; Etsuzaburo Kudou, both of Ichihara; Tetsuo Kaneyasu, Hitachi; Hiromi Kochi, Fukuyama, all of Japan

[73] Assignee: Hitachi Chemical Company, Ltd., Japan

[21] Appl. No.: 919,609

[22] Filed: Jun. 27, 1978

[30] Foreign Application Priority Data

Jun. 30, 1977 [JP] Japan .................................. 52-78667

[51] Int. Cl.³ .................... C08F 2/00; C08F 222/06; C08F 222/08; B01F 7/00
[52] U.S. Cl. .................................... 526/88; 526/271; 526/272; 526/319; 526/321; 526/920; 366/69
[58] Field of Search ................ 526 MS File/; 526/88, 526/271, 272, 319, 321, 920; 366/69

[56] References Cited

U.S. PATENT DOCUMENTS

| | | | |
|---|---|---|---|
| 2,430,313 | 11/1947 | Vana ..................................... | 526/272 |
| 3,836,510 | 9/1974 | Takahashi ............................ | 526/271 |
| 3,925,329 | 12/1975 | Heinrich et al. ..................... | 526/271 |

*Primary Examiner*—John Kight, III
*Attorney, Agent, or Firm*—Craig & Antonelli

[57] ABSTRACT

A powdered copolymer of an ethylenically unsaturated compound having a terminal double bond such as diisobutylene, styrene, an acrylate or an methacrylate and maleic anhydride or an ester thereof can directly be obtained by a polymerization process which comprises polymerizing the monomer mixture in a kneader or a Banbury type mixer in the presence or absence of a poor solvent for the copolymer to be produced to form a highly viscous resin phase containing the copolymer produced and the starting monomers dissolving said copolymer, kneading the highly viscous resin phase, proceeding further the polymerization reaction while kneading and shearing the resin phase to produce solid aggregates, and powdering said aggregates to produce a powdered copolymer.

14 Claims, 12 Drawing Figures

PROCESS FOR PRODUCING POWDERED COPOLYMERS OF ETHYLENICALLY UNSATURATED COMPOUND AND MALEIC ANHYDRIDE OR AN ESTER THEREOF

This invention relates to a process for producing a copolymer in the form of powder from an ethylenically unsaturated compound having a terminal double bond and maleic anhydride or an ester derivative thereof by a polymerization procedure.

Copolymers of ehtylenically unsaturated compounds such as styrene, isobutylene, and the like, and maleic anhydride or ester derivatives thereof have been utilized as curing agents for epoxy resins and as adhesives. Further, aqueous solutions of ammonium and alkali metal salts of these copolymers have been utilized in floor-polish compositions, printing inks and sizing agents. Since these copolymers are used in the form of solution in water or an organic solvent or after further reaction with other components, powdered copolymers are preferred for such purposes. For the production of the above copolymers, there have generally been known processes of solution polymerization and precipitation polymerization. In the former process, complicated steps of recovering a large quantity of organic solvents, drying the product and grinding the dried product are necessary, while in the latter process, depending on the type of α-olefin, some copolymers precipitate with difficulty from any solvent or solvent mixture.

In a common bulk polymerization process, owing to a rapid increase in viscosity of the reaction mixture, agitation becomes difficult with the progress of polymerization and the final reaction mixture, which is completely solid, can be discharged from the reactor only with great difficulty. To overcome the difficulty in discharging the polymerized solid product, there has been used a procedure in which the polymerizate from the bulk polymerization in a polymerizer is melted by heating it at a temperature exceeding its softening point and the discharged molten mass is pelletized by means of an extruder or the like. A typical example has been known in the case of polystyrene. Such a procedure has disadvantages in that large scale apparatus are required for the separate use of a polymerizer and a pelletizer and that a polymerizate with low thermal stability tends to decompose during melting and is also difficultly pelletizable.

Further in the bulk polymerization, when a polymer produced is insoluble in the starting monomer as in the case of vinyl chloride and polyvinyl chloride, the polymer precipitates in the form of powder with the progress of polymerization and, if the powder is not uniformly dispersed, massive aggregates will be formed. To prevent this, there is known a procedure in which the polymer in powder form is agitated in the monomer in a mixing apparatus of the ribbon blender type to continue the polymerization.

However, in the case of copolymer of an ethylenically unsaturated compound having a terminal double bond and maleic anhydride or an ester derivative thereof, the polymer is soluble at least in maleic anhydride or an ester derivative thereof. Accordingly, when the copolymerization is conducted by bulk polymerization or a polymerization in the presence of a poor solvent for the copolymer, the copolymer formed with the progress of polymerization remains dissolved in the monomer to increase the viscosity of the liquid phase (monomer phase) and there is shortly formed a highly viscous resin phase. With further progress of the polymerization, the highly viscous resin phase transforms into solid aggregates which cannot be disintegrated into powdered copolymer by means of an above-noted blender for dispersing polymer powder. In order to obtain powder, it is required to knead the highly viscous resin phase and to disintegrate the solid aggregates into powder.

There is also known a process for producing a granular polymer (for example, trioxane polymer) from a reactant mixture which tends to polymerize into a hard and easily disintegratable solid mass, by using an apparatus comprising a screw and a barrel in which the screw rotates freely in either the same direction or opposite direction of the rotation of the barrel, said barrel having multiple teeth protruding inward from the barrel wall and said screw having multiple interruptions in the screw flight so that in operation the teeth may pass through the screw interruptions without contacting. The polymer layer is formed between the barrel wall and the surface of the screw blade. A polymerizable reactant mixture is fed continuously from the one end (front end) of the barrel and moves through the apparatus while polymerization is in progress. When reacted a section near the other end (rear end), the reaction mixture forms a compact polymer layer between the screw and the barrel wall (the clearance being, for example, 1.3 cm) to plug the clearance so that the liquid phase in the barrel may not leak through the clearance. The polymer is discharged in the form of granules from the rear end. This process is not useful unless the polymer precipitates out of the monomer phase and the polymerization proceeds rapidly within a period as short as, for example, 5 to 10 minutes, forming a compact polymer layer. It is not applicable to the case of copolymerization of an ethylenically unsaturated compound having a terminal double bond and maleic anhydride or an ester derivative thereof, where the formed copolymer is soluble in at least maleic anhydride or an ester derivative thereof and, hence, not precipitates but remains dissolved in the monomer phase to increase gradually its viscosity and, moreover, the reaction between the ethylenically unsaturated compound and maleic anhydride or an ester derivative thereof requires a long time before the formation of a compact polymer layer to plug the clearance between the screw and the barrel wall, necessitating an apparatus of a great length. Further, the above-mentioned polymerizer of the screw type is not advantageous in copolymerization of the ethylenically unsaturated compound and maleic anhydride or an ester derivative thereof, because of difficult dissipation of heat evolved during the polymerization and of a large power consumption.

The afore-mentioned difficulties have been eliminated in the process of this invention which easily produces a copolymer in powder form at the end of polymerization in a polymerizer and is suitable for the copolymerization of the ethylenically unsaturated compound and maleic anhydride or an ester derivative thereof.

According to this invention, there is provided a process for producing a powdered copolymer of an ethylenically unsaturated compound having a terminal double bond and maleic anhydride or an ester derivative thereof, which comprises a polymerizing a polymerizable reactant mixture comprising the ethylenically unsaturated compound and maleic anhydride or an ester derivative thereof in a kneading machine in the presence or absence of a poor solvent for the copolymer to form a highly viscous resin phase containing the copolymer produced and the starting monomers dissolving the copolymer, kneading the highly viscous resin phase, proceeding further the polymerization reaction while kneading and shearing the resin to produce solid aggregates, and powdering the solid aggregates to produce a powdered copolymer.

In the process of this invention, the ethylenically unsaturated compound and maleic anhydride or an ester derivative thereof are subjected to copolymerization in a kneading machine and the reaction system undergoes change of state in the following manner: On initiation of the polymerization, the copolymer formed dissolves in the remaining monomer capable of dissolving the copolymer, forming a liquid phase, the viscosity of which increases more and more; with further progress of the polymerization, the viscosity of the liquid phase becomes higher and the reaction system changes into an indefinite form resin phase of a viscosity of 2,000 to several tens thousands, the resin phase being not a complete solid and being able to be kneaded, while being kneaded with rotating blades of the kneading machine; with still further progress of the polymerization the high-viscosity resin phase increases in viscosity and the kenading action of the rotating blade becomes accompanied with a tearing action; while being kneaded and torn, the resin phase becomes so viscous that it may be called an approximately solid phase and the tearing action of the rotating blades changes to a disintegrating action; and finally a powdered copolymer is obtained in the kneading machine when the polymerization is complete. Thus, in the process of this invention, the change from kneading to disintegration occurs continuously along with viscosity increase in the resin phase and a powdered copolymer is easily obtained.

The kneading machine used in this invention is a batch type capable of exerting kneading, kneading-tearing, and disintegrating actions to the reaction system in accordance with the change of state of the reaction system during the reaction, from a high-viscosity liquid state, through an intermediate, nearly solid state to finally a solid state. It is of course possible to carry out the polymerization continuously by using a number of such batch-type kneading machines in series and transferring successively the reaction mixture in each reaction stage to the next kneading machine. The kneading machines suitable for the purpose of this invention are those of the kneader mixer type described in "Chemical Engineers' Handbook", Perry, pages 1207–1208, Mcgraw-Hill Book Co. (1950) and internal mixer type described in "Encyclopedia of Chemical Technology", Kirk & Othmer, vol. 9, page 164–165, Interscience Pub., Inc. (1952). Machines, such as crutcher, which are designed for use in mixing and kneading only are not suitable. Among the kneading machines, most suitable are kneaders and internal (or Banbury type) mixers, those being able to be operated under normal or reduced pressure and those being able to be provided with a reflux apparatus.

In the process of this invention, by the use of the above batch-type kneading machine, it is possible to reduce the load on the rotating blades imposed by mixing and disintegrating works. For this purpose, it is desirable that the internal free volume of the kneading machine is about twice or more the total volume of the charge including the reactant mixture and a poor solvent for the copolymer. When a suitable volume ratio is used, kneading and disintegration occur under such conditions that the high-viscosity resin phase and solid resin mass are heaped on the rotating blades, so that the blade load may be reduced.

In the process of this invention, a desirable and important condition is the presence of a poor solvent for the copolymer or the presence of the ethylenically unsaturated compound in excess of maleic anhydride or an ester derivative thereof when the copolymer is not soluble in said ethylenically unsaturated compound. The presence of these substances is desirable for the control of reaction temperature and for maintaining the aforesaid change of state of the reaction system. The heat evolved during the exothermic reaction of the ethylenically unsaturated compound and maleic anhydride or an ester derivative thereof may be counterbalanced with the latent heat of vaporization of the poor solvent or the excess ethylenically unsaturated compound or may be dissipated through the kneader wall by conduction, thus making the temperature control easy. The poor solvent or the excess ethylenically unsaturated compound is entrapped in the high-viscosity resin phase in the kneading stage and facilitates the disintegration of solidified resin phase mass in the later stage, contributing to the reduction in power source capacity. The poor solvent and excess ethylenically unsaturated compound can be easily recovered by distillation under normal or reduced pressure from the kneader while agitating the powdered copolymer with the rotating blades after completion of the polymerization. The amount of the poor solvent or the excess ethylenically unsaturated compound in the initial reactant mixture is preferably 20% by weight or more, particularly 30 to 100% by weight based on the expected amount of copolymer. The "expected amount" is the theoretical amount of polymer which will be formed from the ethylenically unsaturated compound and maleic anhydride or an ester derivative thereof, if the polymerization is perfectly carried out.

For instance, in the case of copolymerization of styrene or a styrene derivative and a maleate ester, since the resulting copolymer is generally soluble in the monomers and has a low softening point, the kneading stage remains for a long period of time and the tearing stage is comparatively difficult to set in, whereas when a poor solvent for the copolymer, such as, for example, cyclohexane, octane or the like, is present in an amount of 20% by weight or more, preferably 30 to 100% by weight of the amount of copolymer to be formed, the temperature control becomes easy and tearing of the resin phase occurs in due time, whereby said difficulty is avoided.

In the case of copolymerization of styrene or a styrene derivative and maleic anhydride as another example, since the polymerization proceeds rapidly and evolves a large amount of heat, it is comparatively difficult to obtain a copolymer of the desired molecular weight unless an adequate temperature control is furnished, whereas when a poor solvent for the copolymer, such as benzene, toluene, xylene, cyclohexane or octane is present in an amount of 20% by weight or more, preferably 30 to 100% by weight based on the expected amount of copolymer, the temperature control becomes easy and a copolymer with a desired molecular weight may be obtained.

Also in other cases, the presence of a poor solvent and/or excess of ethylenically unsaturated compound generally facilitates the temperature control. The type and amount of the poor solvent and the ethylenically unsaturated compound which do not dissolve the copolymer are selected in accordance with the particular type of copolymerization. A sufficient amount is 20% by weight or more based on the expected amount of the copolymer and it is desirable to provide a refluxing means such as a reflux condenser at the top of the kneading machine in order to ensure the effect of poor solvent or the ethylenically unsaturated compound which is a poor solvent.

Commercially available diisobutylene contains, beside 70-75% by weight of 2,4,4-trimethylpentene-1 which is an α-olefin, 2,4,4-trimethylpentene-2 which is not copolymerizable with maleic anhydride. When such diisobutylene is used as the source of the ethylenically unsaturated compound, 2,4,4-trimethylpentene-2 acts as a poor solvent, because it does not dissolve the copolymer of 2,4,4-trimethylpentene-1 and maleic anhydride. 2,4,4-Trimethylpentene-1 and -2 do not copolymerize with each other nor homopolymerize each alone.

When an ethylenically unsaturated compound and maleic anhydride or an ester derivative thereof are not mutually soluble and polymerization is carried out in a heterogeneous phase, the progress of reaction is sometimes retarded and a low conversion is resulted. In such a case, the conversion can be improved by the addition of a small amount of a solvent in which both monomers are soluble. An example is the case where diisobutylene is used as the source of the ethylenically unsaturated compound. Since diisobutylene and maleic anhydride are mutually scarcely soluble and the difference in specific gravity is quite large, the reaction system separates completely into two layers in the early stage of reaction where the mixing effect exhibited by a kneading machine is also insufficient, resulting in retardation of the reaction. The conversion can be greatly improved by the addition of a solvent in which both monomers are soluble, such as, for example, toluene, xylene, dioxane, methyl ethyl ketone, or methyl isobutyl ketone, in an amount not to transform the reaction system into a solution polymerization system, and the same conversion can be obtained even when the amount of polymerization catalyst is reduced to one half or less.

In general, when an ethylenically unsaturated compound and maleic anhydride or an ester derivative thereof are not mutually soluble, the above-mentioned improvement in conversion can be often achieved by the addition of a solvent in which both monomers are soluble, in an amount not to transform the reaction system to a solution polymerization system (such a solvent often dissolves the copolymer). However, if used in a large amount, such a solvent reveals a disadvantage of increasing the amount of unreacted monomers. Therefore, the amount preferable for the improvement of conversion is 30% by weight or less, particularly 5 to 20% by weight based on the expected amount of copolymer. In this invention, the use of such a solvent is limited to such a case as mentioned above.

The ester derivatives of maleic anhydride used in this invention are those esters which can be obtained, for example, by the reaction of 1 mole of maleic anhydride with 1 to 2 moles of monohydric alcohols. The monohydric alcohols include methanol, ethanol, isopropanol, butanols, heptanols, octanols, and the like. Maleic anhydride and ester derivatives thereof are used each alone or in combinations of two or more of these. Half-esters are preferred as the ester derivatives of maleic anhydride.

The ethylenically unsaturated compound having a terminal double bond used in this invention are those which are copolymerizable with maleic anhydride or ester derivatives thereof, such as, for example, the compounds represented by the structural formula:

wherein $R_1$ is hydrogen, an alkyl group having 1 to 15 carbon atoms, aryl group, $-O-R_3$,

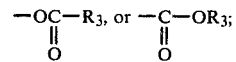

and $R_2$ and $R_3$ are independently hydrogen or an alkyl group having 1 to 10 carbon atoms. Examples of these compounds are hexene-1, heptene-1, 2-methylhexene-1, octene-1, 2-methylheptene-1, 2,4,4-trimethylpentene-1, decene-1, mixtures of these compounds, mixtures of these compounds with other non-reactive alkenes and alkanes, styrene, α-methylstyrene, α-ethylstyrene, vinyltoluene, methyl vinyl ether, vinyl acetate, methyl acrylate, methyl methacrylate, butyl methacrylate, and the like.

An ethylenically unsaturated compound and maleic anhydride or an ester derivative thereof may be used in any ratio. However, when maleic anhydride or an ester derivative thereof is used in excess, it tends to be retained in the copolymer and is difficult to remove, resulting in reduced purity of the product. Accordingly, a suitable molar ratio of an ethylenically unsaturated compound to maleic anhydride or an ester derivative thereof is in the range of from 1.0:1.0 to 10:1.0, preferably from 1.0:1.0 to 3.0:1.0.

The polymerization is carried out in the presence of a suitable polymerization initiator, that is, a free radical catalyst. The polymerization catalysts used are usually peroxides or organic compounds having an azo group. Examples of the catalysts are peroxides such as benzoyl peroxide, acetyl peroxide and tert-butyl peroxide and azo compounds such as α,α'-azobisisobutyronitrile. Selection of the catalyst depends on the reaction temperature. The amount of catalyst used in ordinary polymerization is in the range of about 0.05 to 5.0% by weight based on the weight of monomer mixture, depending on the required molecular weight of the copolymer. If necessary, a larger or smaller amount of catalyst can be used.

The polymerization temperature is determined primarily by the type of catalyst and is set on the basis of half-life of the catalyst. Generally, polymerization is carried out at a temperature at which the half-life of the catalyst becomes 180 to 10 minutes. For instance, preferable polymerization temperature is 80° to 120° C. for benzoyl peroxide and 70° to 100° C. for azobisisobutyronitrile.

The temperature at which the disintegration is carried out is a temperature at which the copolymer is in a solid state and is lower than the softening point, meling point, or decomposition point of the copolymer formed. It is determined by taking into account the type and quantity of the copolymer and reactants so that no wet powder may be formed and almost completed polymerization may be led to ultimate completion. A preferred disintegration temperature is lower than the softening point, melting point, or decomposition point by 10° to 50° C.

Examples of kneaders used in the process of this invention are illustrated below with reference to accompanying drawings.

FIG. 1 is a plan view of a kneader with the top cover removed.

FIG. 2 is a cross sectional view on line a—a' of FIG. 1, which shows rotating blades 1 and 2 at vertical position. The blades are so arranged that they may rotate nearly in contact with the wall surface 3. The blades rotate in opposite direction without contacting with each other but the clearance between the blades diminishes with rotation. The blades rotate together with the shafts 4 and 5 which are interlockingly driven by a prime mover; alternatively, the shafts 4 and 5 may be interlocked by means of gearing. There are various types of rotating blades such as Z-type, sigma-type, double S-type, etc. as shown in FIGS. 3 to 5. Also available are an overlapping type (FIG. 6) and a tangential type (FIG. 7), each with two blades running at different speeds in FIG. 7. Plan views of the blade used therein are also shown in FIGS. 6 and 7. Although a double-arm type is shown in FIGS. 1 to 7, a single-arm type and multiple-arm type may be used. In a single-arm kneader, the container wall should be provided with a number of inward protrusions which will not come in contact with the rotating blade. There are available kneaders with various mechanisms for the discharge of a powdered copolymer, such as tilting mechanism (FIG. 8), a discharge valve at the bottom (FIG. 9) and an extruder-type mechanism, in which the contents are taken out of an extruder-type outlet (FIG. 10).

In FIGS. 6 to 10, outlines of container wall and rotating blade are shown in solid lines.

The invention is illustrated below with referecne to Examples.

EXAMPLE 1

Figure 1:
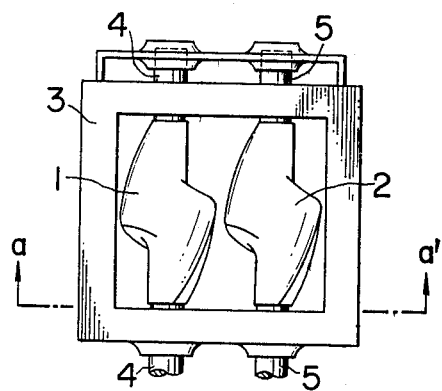
Figure 2:
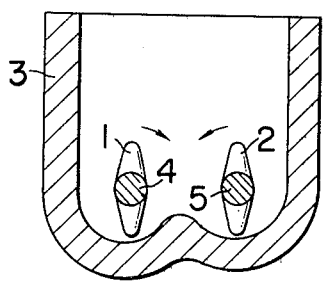
Figure 3:
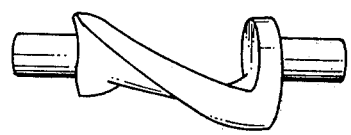
Figure 4:
Figure 5:
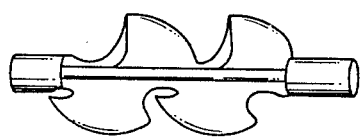
Figure 6:
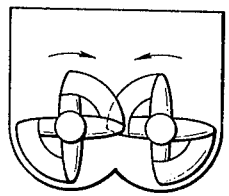
Figure 7:
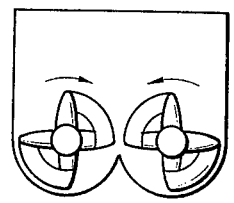
Figure 8:
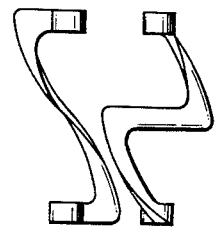
Figure 8:
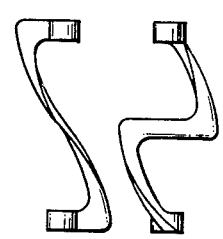
Figure 8:
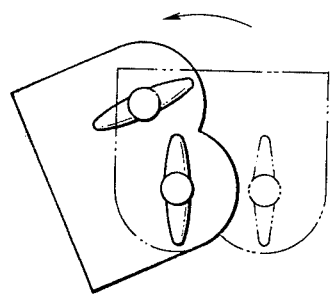
Figure 9:
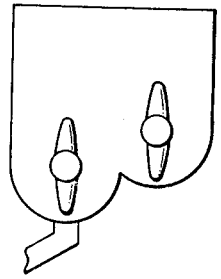
Figure 10:
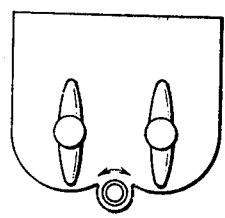
Figure 11:
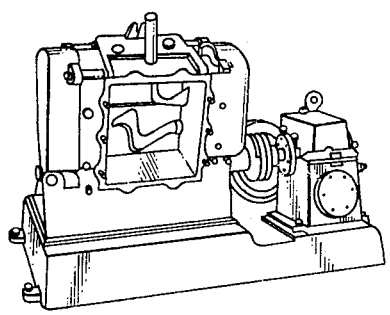
FIG. 11 is an oblique view of an example of a kneader.
Figure 12:
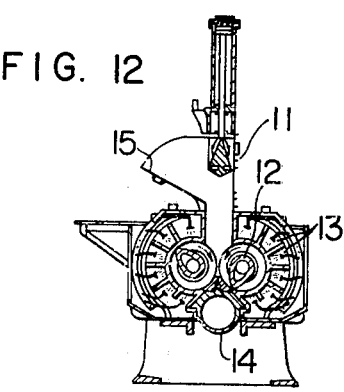
FIG. 12 is a cross sectional view of an internal (or Banbury type) mixer, wherein 11 is double-slope floating weight, 12 is roters cored for inculation of cooling water or steam, 13 is spray side, 14 is sliding discharge door, and 15 is feed-hopper door.

A mixture of 10 moles (1580 g) of monoisopropyl maleate and 12 moles (1243 g) of styrene was charged into a kneader (12 liters in internal free volume; with 2 HP motor for mixing) having Banbury type blades as shown in FIG. 1, which was employed as a reactor. To the mixture, heated to 90° C., was added gradually 0.3 mole (72.6 g) of benzoyl peroxide, as the polymerization catalyst, over a period of 30 minutes. As soon as the reaction was initiated, polymerization heat was evolved and the temperature reached 130° C. in 10 minutes from the beginning of the addition of polymerization catalyst. The reaction was allowed to continue at this temperature. The reaction mixture remained as a low-viscosity liquid during the first 30 minutes and then gradually increased in viscosity, forming a high-viscosity resin phase which was kneaded by the rotating blades. With the progress of reaction, the resin phase became more and more viscous and kneaded as if the resin phase was lifted in heaps on the rotating blades. After having been allowed to react for 3 hours, the reaction mixture was cooled to about 90° C. and allowed to be kneaded and torn by rotating blades. The copolymer was then kneaded and disintegrated at about 80° to 85° C. in the kneader to obtain 2,800 g of the copolymer in the form of pale yellow powder. The copolymer contained 0.5% by weight of unreacted sytrene and 1.5% by weight of maleate monoester, as analyzed by gas chromatography. The copolymer had an intrinsic viscosity $[\eta]$ in dioxane (25° C.) of 0.42 and a softening point of 125°–135° C.

EXAMPLE 2

In a kneader similar to that described in Example 1 but having a reflux apparatus were placed 10 moles (1,580 g) of monoisopropyl maleate, 12 moles (1,248 g) of styrene and 1,000 g of n-octane which is a poor solvent for the copolymer. The mixture was heated with mixing to 90° C. To the mixture at 90° C., was added gradually 0.3 mole (72.6 g) of benzoyl peroxide (polymerization catalyst) over a period of 30 minutes. The violent evolution of the heat of the reaction was easily controlled and the reaction temperature could be maintained at 90° to 95° C. The reaction was allowed to proceed at this temperature. The reaction mixture remained as a low-viscosity liquid during the addition of the polymerization catalyst and then gradually increased in viscosity to form a high-viscosity resin phase. While being kneaded, the resin phase further increased in viscosity and lifted in heaps on the rotating blades. After about 2 hours of reaction, the kneading-tearing took place and the resin phase became an apparently solid mass which soon began to be disintegrated. Finally, the resin mass was completely disintegrated to powder. The load borne by the rotating blades at this stage was about half the load in Example 1. After 6 hours of reaction, the copolymer contained 0.2% by weight of unreacted styrene and 1.0% by weight of unreacted monoisopropyl maleate. On termination of the reaction, the n-octane, a poor solvent, was removed from the kneader by distillation under reduced pressure and 2,790 g of a dry powdered copolymer having a softening point of 140°–145° C. was obtained.

EXAMPLE 3

Into the aforementioned kneader, were added 20 moles (2,240 g) of diisobutylene (75% in 2,4,4-trimethylpentene-1 content), 10 moles (980 g) of maleic anhydride, and 0.3 mole (72.6 g) of benzoyl peroxide as polymerization catalyst. The mixture was allowed to react at 90° to 95° C. The change of state during the reaction was nearly the same as in Example 2 and a powdered copolymer was formed (2,4,4-trimethylpentene-2 and other impurities functioned as poor solvent for the copolymer). After 6 hours of reaction, the excess 2,4,4-trimethylpentene-1 was removed from the kneader by distillation under reduced pressure to obtain 2,050 g of a dry, powdered copolymer (2,4,4-trimethylpentene-1: maleic anhydride=1.0:1.0 in polymer composition) which contained 1.2% by weight of maleic anhydride as unreacted monomer. The intrinsic viscosity $[\eta]$ in dioxane (25° C.) was 0.40 and the softening point was 250° C. (decomp.).

EXAMPLE 4

The procedure of Example 3 was repeated, except that 300 g of toluene (a solvent for the copolymer) was added to the starting materials, 0.1 mole of benzoyl peroxide was used, and the reaction was carried out at 100° to 105° C. for 2 hours. A powdered copolymer similar to that obtained in Example 3 was obtained.

EXAMPLE 5

Into the aforementioned kneader, were charged 10 moles (980 g) of maleic anhydride and 500 g of toluene. To the mixture which had been heated to 90° C., was added dropwise over a period of 30 minutes a solution of 0.1 mole (24.2 g) of benzoyl peroxide (polymerization catalyst) in 10 moles (1,040 g) of styrene, while maintaining the reaction temperature at 90° to 95° C. (if toluene is absent, the temperature will rise to 120° to 130° C. owing to violent evolution of heat). The change of state which accompanied the progress of reaction after the addition of polymerization catalyst was nearly the same as in Example 2. The polymerization reached completion in 4 hours. The copolymer formed was powder wet with toluene. The unreacted monomer content of the copolymer was 0.2% by weight of styrene and 0.3% by weight of maleic anhydride. The toluene was removed from the kneader by distillation under reduced pressure, leaving behind 1,010 g of a powdered copolymer having an intrinsic viscosity $[\eta]$ of 1.10 in dioxane (25° C.) and a softening point of 250° C. (decomp.).

As is apparent from the foregoing description, according to this invention a mixture of starting materials, that is, an ethylenically unsaturated compound and maleic anhydride or a half-ester thereof, is charged into a kneader and allowed to undergo polymerization, while operating continually the kneader. With the progress of polymerization, the reaction mixture increases in viscosity and gradually changes into solid resin masses, while the function of the kneader changes gradually from kneading to disintegration. Thus, at the end of polymerization, there is obtained a powdered copolymer in the kneader. Accordingly, this invention provides a powdered product more easily than a conventional process in which solid resin masses are formed in a reactor and then it is disintegrated in another apparatus. The operation and equipment are both simplified as compared with another conventional process in which the polymer obtained is melted in the reactor and the pelletized by means of a screw-type extruder.

What is claimed is:

1. A process for producing a powdered copolymer of an ethylenically unsaturated compound having a terminal double bond and maleic anhydride or an ester derivative thereof, which comprises polymerizing a polymerizable reactant mixture comprising an ethylenically unsaturated compound having a terminal double bond and being represented by the general formula:

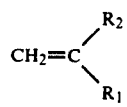

wherein $R_1$ is hydrogen, an alkyl group having 1 to 15 carbon atoms, an aryl group, $-OR_3$,

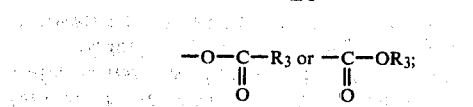

and $R_2$ and $R_3$ are independently hydrogen or an alkyl group having 1 to 10 carbon atoms, and maleic anhydride or an ester derivative thereof in a kneading machine with continuous kneading of the reactant mixture in the presence or absence of a poor solvent for the copolymer to form a highly viscous resin phase containing the copolymer produced and remaining polymerizable reactant mixture at least one reactant of which is capable of dissolving the copolymer, further kneading the highly viscous resin phase, effecting further polymerization of the resin phase while kneading is continued with tearing of the resin phase to produce solid resin aggregates containing said copolymer, and continuing the kneading to effect powdering of the solid resin aggregates to produce a powdered copolymer; the internal free volume of the kneading machine being about twice or more of the volume of the reactant mixture or the total volume of the reactant mixture and the poor solvent for the copolymer.

2. A process according to claim 1, wherein the kneading machine is a kneader-mixer or an internal mixer.

3. A process according to claim 1 or 2, wherein the polymerization is carried out in the presence of an excess amount, based on the amount of maleic anhydride or an ester derivative thereof, of the reactant ethylenically unsaturated compound component which is a poor solvent for the copolymer to be formed or in the presence of a poor solvent for the copolymer to be formed.

4. A process according to claim 3, wherein the excess amount of the reactant ethylenically unsaturated compound component which is a poor solvent for the copolymer to be formed or the amount of the poor solvent for the copolymer to be formed is 20% by weight or more based on the expected amount of the copolymer.

5. A process according to claim 1, wherein copolymerization of ethylenically unsaturated compound having a terminal double bond and maleic anhydride or an ester derivative thereof which are not miscible is carried out in the presence of 30% by weight, based on the expected amount of the copolymer, or less of a solvent miscible with both reactants.

6. A process according to claim 2, wherein the kneading machine has a reflux condenser at the top.

7. A process according to claim 1, wherein the ethylenically unsaturated compound is an alkene having 6 to 12 carbon atoms.

8. A process according to claim 1, wherein the ethylenically unsaturated compound is at least one member selected from the group consisting of styrene, styrene derivatives and 2,4,4-trimethylpentene-1.

9. A process according to claim 1 wherein the ester derivative of maleic anhydride is obtained from a monohydric alcohol containing from 1 to 8 carbon atoms.

10. A process according to claim 1 wherein the molar ratio of the ethylenically unsaturated compound to the maleic anhydride or an ester derivative thereof is from 1.0:1.0 to 10:1.0.

11. A process according to claim 1 wherein polymerization of the polymerizable reactant mixture as well as the highly viscous resin phase is effected at a temperature ranging from 70° to 120° C. with a catalyst.

12. A process according to claim 11 wherein powdering of the solid resin aggregates is effected at a temperature that is lower than the softening point, melting point or decomposition point of the copolymer by 10°–50° C.

13. A process according to claim 1 wherein kneading of the polymerization reaction mixture, the highly viscous reaction phase and the solid resin aggregates is effected within a single batch-type kneading machine.

14. A process according to claim 1 wherein kneading of the polymerization reactant mixture, the highly viscous resin phase and the solid resin aggregates is effected, successively, in a series of kneading machines.

* * * * *